United States Patent [19]

Crist

[11] Patent Number: 4,937,941

[45] Date of Patent: Jul. 3, 1990

[54] ADAPTER TO CONVERT A KNIFE INTO A SKINNING TOOL

[76] Inventor: Gerald L. Crist, 632 S. 6th, Greybull, Wyo. 82426

[21] Appl. No.: 414,942

[22] Filed: Sep. 29, 1989

[51] Int. Cl.⁵ .......................... A22B 5/16; B26B 29/00
[52] U.S. Cl. ........................................... 30/294; 17/21; 30/123.5
[58] Field of Search ............... 30/123.5, 123.6, 123.7, 30/286, 289, 293, 294; 17/1 R, 21

[56] References Cited

U.S. PATENT DOCUMENTS

| | | | |
|---|---|---|---|
| 3,445,931 | 5/1969 | Knudson | 30/294 X |
| 4,290,201 | 9/1981 | Goodwin | 30/294 |
| 4,587,735 | 5/1986 | Walters et al. | 30/294 X |
| 4,601,102 | 7/1986 | Phillips | 30/123.5 |
| 4,607,432 | 8/1986 | Montgomery | 30/294 |
| 4,707,920 | 11/1987 | Montgomery | 30/294 |
| 4,763,416 | 8/1988 | Copeland | 30/294 |

Primary Examiner—Douglas D. Watts
Attorney, Agent, or Firm—Robert W. Becker & Associates

[57] ABSTRACT

An adapter for converting a knife into a skinning tool. The adapter comprises a removable point protector that fits over the tip of the knife blade, with the point protector being provided with first securement means. The adapter also comprises a bottie to securely hold the point protector on the tip of the blade, with the bootie including means for fitting over an end of the knife remote from the blade tip thereof, and with the bootie including second securement means for connection to the first securement means of the point protector to snugly hold the point protector on the tip of the knife blade, with the second securement means being connected to the means of the bootie for fitting over the end of the knife.

15 Claims, 1 Drawing Sheet

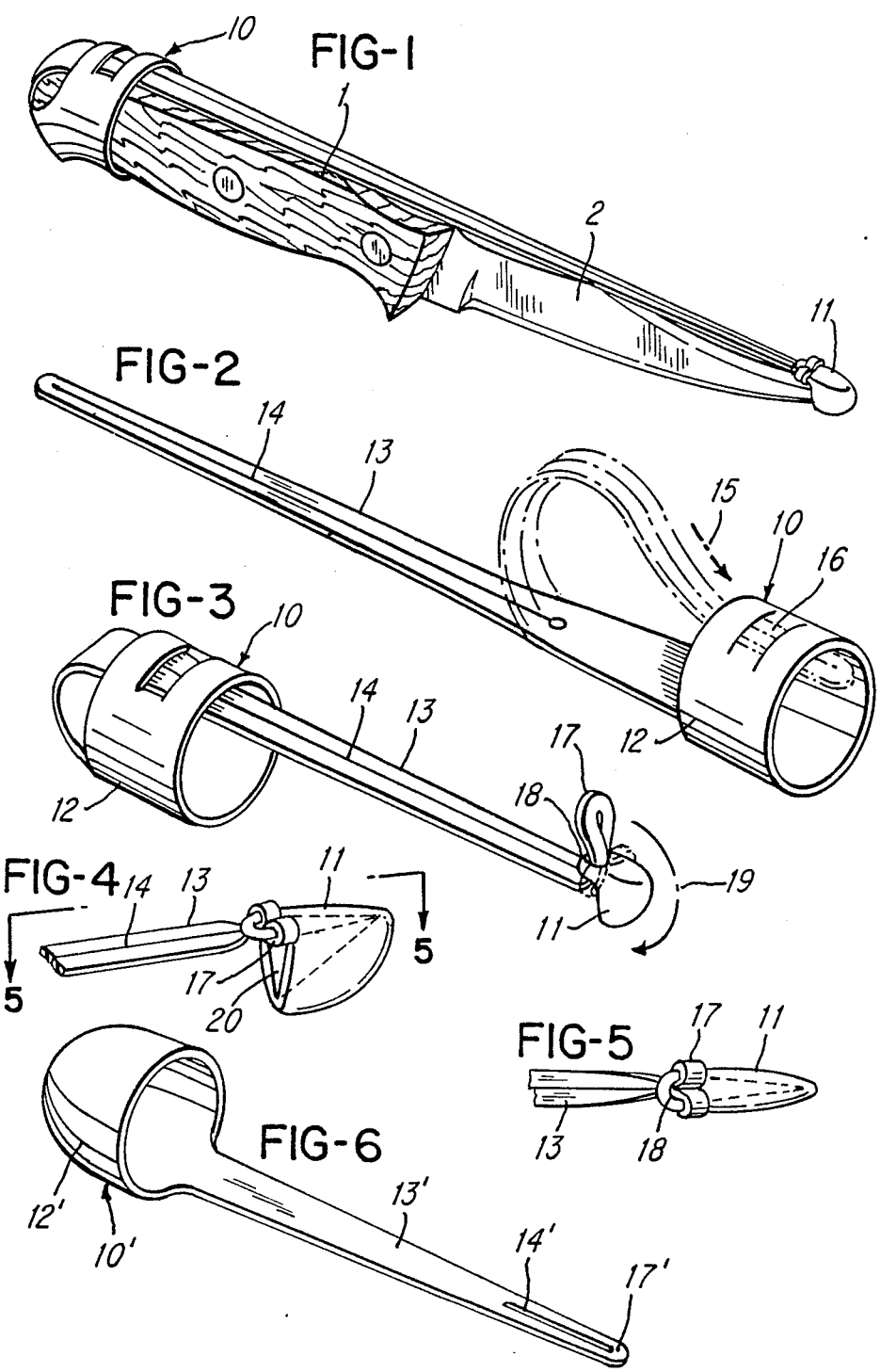

ADAPTER TO CONVERT A KNIFE INTO A SKINNING TOOL

BACKGROUND OF THE INVENTION

The present invention relates to an adapter for converting a knife, which has a blade with a tip, into a skinning tool.

An adapter to convert a knife into a skinning tool facilitates the skinning and evisceration of animals. During a skinning operation, such an adapter lifts a skin of the animal from the muscle tissue, thus allowing the knife to slide up under the skin without slicing the skin or cutting up the meat. During evisceration, an adapter prevents the knife point from puncturing the entrails.

Several different types of adapters are already known. For example, in U.S. Pat. No. 4,763,416, W. Duane Copeland, issued Aug. 16, 1988, there is provided a guard member that fits over the tip of a knife blade, with this guard member then being manually retained on the knife via a strand, which could also be secured to a hand guard of the knife. On the one hand, manually retaining the guard member is very impractical; on the other hand, very few knives have a hand guard.

In the device disclosed in U.S. Pat. No. 4,290,201, Joseph Goodwin, issued Sep. 22, 1981, a string is attached to the device and is then wrapped around the handle of the knife. This has not proven to be a very satisfactory solution.

U.S. Pat. No. 4,707,920, Calvin W. Montgomery, issued Nov. 24, 1987, provides a retractable, pivotably mounted point protector, with a cord being used to secure the point protector in place on the blade. Not only is this approach more expensive, too much of the knife blade is covered by the device. U.S. Pat. No. 4,607,432, Calvin W. Montgomery, issued Aug. 26, 1986, merely discloses a pivotably mounted gut hook.

U.S. Pat. No. 4,601,102, Robert W. Phillips, issued July 22, 1986, discloses a knife guard that has a thumb rest to allow the guard to be held on a knife.

It is an object of the present invention to provide an adapter, to convert a knife into a skinning tool, that is practical to retain on a knife, is efficient to use, and is economical to produce.

BRIEF DESCRIPTION OF THE DRAWING

This object, and other objects and advantages of the present invention, will appear more clearly from the specification in conjunction with the accompanying schematic drawing, in which:

FIG. 1 shows one exemplary embodiment of the inventive adapter disposed on a hunting knife;

FIG. 2 shows one exemplary embodiment of the inventive bootie for an adapter of the present invention, showing a first stage in preparing the bootie for attachment to a point protector of the present invention;

FIG. 3 shows how the bootie of FIG. 2 is attached to a point protector of the present invention;

FIG. 4 is a fragmentary view showing a point protector attached to the end of the bootie strap;

FIG. 5 shows the point protector of FIG. 4 from the top; and

FIG. 6 shows a second exemplary embodiment of the inventive bootie.

SUMMARY OF THE INVENTION

The adapter of the present invention is characterized primarily by: a removable point protector that fits over the tip of the blade, with the point protector being provided with first securement means; and a bootie to securely hold the point protector on the tip of the blade, with the bootie including means for fitting over an end of the knife remote from the blade tip thereof, and with the bootie including second securement means for connection to the first securement means of the point protector to snugly hold the point protector on the tip of the knife blade, with the second securement means being connected to the means of the bootie for fitting over the end of the knife.

Pursuant to a preferred embodiment of the inventive adapter, the second securement means of the bootie is made of elastomeric material that stretches. The second securement means may be an elastic strip, and the first securement means of the point protector may be a hole in the point protector through which the strap is disposed. That portion of the elastic strap that is disposed through the hole in the point protector may be looped about the point protector to effect connection between the bootie and the point protector.

The point protector is preferably made of hard plastic, and is provided with a cutout portion to receive the tip of the knife blade. This cutout portion may have the shape of a triangular pyramid, and the point protector itself preferably has rounded-off edges. The cutout portion should comprise flat planes to keep the tip of the blade of the knife from coming into contact with the inside of the point protector.

Although hard plastic presently appears to be the preferred material for the point protector, any material of sufficient strength, hardness, and durability would be suitable. Thus, for example, metals, alloys, plastics, and graphite compositions would all be suitable materials for the point protector. However, the point protector should have a smooth, slick surface when cast or molded, thereby saving finishing costs. In addition, the point protector should be resistant to heat, moisture, and corrosion from detergents and other chemicals.

Any elastomeric material that has good elasticity, adequate strength, good shape retention, and good resistance to heat, moisture, and chemicals would be suitable for the bootie and the strap thereof. By way of example only, rubber and neoprene coated latex could be used for the bootie.

In one specific embodiment of the bootie of the inventive adapter, the means of the bootie for fitting over the end of the knife includes a cup-shaped portion to which the elastic strap is connected, with the cup-shaped portion and the elastic strap preferably being made of a single piece of elastomeric material.

Pursuant to an alternative specific embodiment of the bootie, the means of the bootie for fitting over the end of the knife includes a circular portion to which the elastic strap is connected, with the circular portion and the elastic strap again preferably being made of a single piece of elastomeric material. The circular portion may be provided with a slit portion to receive the elastic strap therethrough in such a way as to form an abutment for the end of the knife that is remote from the blade tip thereof.

The elastic strap may be provided with a longitudinal slit at least in the vicinity of that portion thereof that is disposed through the hole in the point protector. In addition, the elastic strap runs along that side of the knife blade that is remote from the cutting edge thereof.

The adapter of the present invention has numerous advantages over heretofore known devices. For example, the inventive adapter quickly and efficiently attaches to all hunting knives without the need for any tools. In addition, the point protector can be quickly removed, as it is often necessary to switch to a normal cutting mode during a "skinning" operation. However, even with the point protector removed, the inventive adapter will be retained on the knife via the bootie, so that the adapter cannot be lost.

Furthermore, the point protector is retained on the tip of the knife blade by the adapter itself, without the need for any type of manual restraint, so that the knife can be held in a manner most convenient to a user without having to worry about keeping the adapter on the knife.

The inventive adapter is also economical to produce, and can be used with all existing hunting knives. One and the same point protector can be used with a large variety of variously shaped knife points. In addition, the inventive adapter is compact and light in weight.

By being attached to the rear or butt end of the handle of a knife, the inventive adapter keeps the cutting blade nearly completely exposed, thus maximizing the overall operational capability of a knife that has been converted with the inventive adapter to form a skinning tool.

Further specific features of the present invention will be described in detail subsequently.

DESCRIPTION OF PREFERRED EMBODIMENTS

Referring now to the drawing in detail, FIG. 1 shows a hunting knife 1 on which is disposed one exemplary embodiment of the inventive adapter. This adapter has a bootie 10 that fits over the butt end of the knife 1. The inventive adapter also has a point protector 11 that fits over the tip of the blade 2 of the knife 1. The point protector 11 is attached to the bootie 10 in a manner to be described subsequently.

As shown in FIG. 2, in this embodiment of the present invention the bootie 10 comprises a circular portion 12 from which extends an elongated strip 13 which is in the form of a strap and is provided with a central, longitudinal slit 14 for a purpose to be described subsequently.

The bootie 10, and hence the circular portion 12 and the elongated strip 13, are made of an elastic material, such as rubber or a suitable plastic. The bootie 10 is not only flexible, which permits easy mounting, but also allows the bootie, and particularly the strip 13 thereof, to be stretched, and hence to exert a restraining force on the point protector 11 in the assembled and mounted state of the inventive adapter.

To prepare the bootie 10 for mounting on a knife, the strip 13 is folded back on itself toward the circular portion 12 (see the phantom representation in FIG. 2), and is thereupon inserted, in the direction of the arrow 15, through the slit portion 16, which helps guide the strip 13 as well as keep it in place. After a sufficient amount of the strip 13 has been pulled through the slit portion 16 of the circular portion 12 of the bootie 10, the end 17 of the strip 13 is inserted through a hole 18 in the point protector 11, as shown in FIG. 3. The end 17 of the strip 13 is then looped about the point protector 11, in the direction of the arrow 19, and assumes the dashed-line position of FIG. 3. FIGS. 4 and 5 also show the end 17 of the strip 13 in place over the point protector 11. If too much of the strip 13 was pulled through the hole 18 in the point protector 11, so that the end 17 was too long to fit snugly about the point protector 11, the strip 13, and hence the end 17 thereof, can be pulled back away from the point protector 11, so that the point protector will be securely held by the strip 13 of the bootie 10.

The fragmentary views of FIGS. 4 and 5 also show in greater detail the configuration of the point protector 11, which is preferably made of a hard plastic. The point protector 11 is provided with a cutout portion 20 to accommodate the tip of the knife blade 2. As can be seen from the drawing, the point protector 11 has a very compact, slender shape, with rounded edges. The cutout portion 20 within the point protector 11 extends over nearly the entire length of the point protector, and can accommodate a wide variety of blade sizes and shapes in a snug manner. The cutout portion 20 is essentially in the shape of a triangular pyramid. In one specific embodiment of the present invention, the dimensions of the cutout portion 20 are as follows: at the triangular opening thereof into the point protector 11, this opening has a 3 mm base, with two equal 7 mm sides; the cutout portion 20 goes back about 12 mm, and ends in a point.

After the point protector 11 has been attached to the bootie 10, the now assembled adapter is ready to be installed on the knife 1. The bootie 10 is first placed over the butt end of the knife 1, and the point protector 11 is then placed over the tip of the blade 2. In so doing, the strip 13 is preferably stretched somewhat, so that after the point protector 11 has been placed on the tip of the blade 2, the tension in the strip or strap 13 securely holds the point protector 11 in place.

FIG. 6 shows a second exemplary embodiment of the bootie 10' of this invention. In this embodiment, the portion 12' has a cup shape and is ready for placement on the butt end of the knife 1. In so doing, the strip 13' already extends in the proper direction from the cup-shaped portion 12'. It is now merely necessary to secure a point protector to the strip 13'. It is to be understood that this is actually preferably accomplished prior to placing the cup-shaped portion 12' of the bootie 10' on the knife. In addition, the portion 12' of the bootie 10' is preferably of sufficient length to keep the bootie 10' on the butt end of the knife even when the point protector 11 is not on the tip of the knife blade. The slit 14' can either extend throughout the length of the strip 13', as in the embodiment of FIGS. 1–3, or, as shown, can be disposed near the end 17' only. It is merely necessary that the slit 14' be long enough to permit a loop to be formed at the end 17' for placement over a point protector 11 in order to connect the bootie 10' to the point protector.

As an alternative, the strip 13, 13' could also be a non-slitted piece that is tied or otherwise secured to the point protector 11.

The hole 18 provided in the point protector 11 has been shown as being provided on a tab-like portion that in the assembled and mounted state extends back toward the portion 12, 12' of the bootie. However, this tab-like portion could also extend upwardly, i.e. in a direction away from the knife blade 2. In such a case, it would be possible to insert the end 17, 17' of the strip 13, 13' through the hole 18 of the point protector 11 to such an extent that the portion 12, 12' could then be pulled through the loop of the end 17, 17' instead of looping the end 17, 17' about the point protector 11.

The present invention is, of course, in no way restricted to the specific disclosure of the specification and drawing, but also encompasses any modifications within the scope of the appended claims.

What I claim is:

1. An adapter for converting a knife, which has a blade with a tip, into a skinning tool, said adapter comprising:
   a removable point protector that fits over said tip of said blade, with said point protector being provided with first securement means; and
   a bootie to securely hold said point protector on said tip of said blade, with said bootie including means for fitting over an end of said knife remote from said blade tip thereof, and with said bootie including second securement means for connection to said first securement means of said point protector to snugly hold said point protector on said tip of said knife blade, with said second securement means being connected to said means of said bootie for fitting over said end of said knife.

2. An adapter according to claim 1, in which said second securement means of said bootie is made of elastomeric material that stretches.

3. An adapter according to claim 2, in which said second securement means is an elastic strap, and said first securement means of said point protector is a hole in said point protector through which said strap is disposed.

4. An adapter according to claim 3, in which that portion of said elastic strap that is disposed through said hole in said point protector is looped about said point protector to effect said connection between said bootie and said point protector.

5. An adapter according to claim 4, in which said point protector is made of hard plastic.

6. An adapter according to claim 5, in which said point protector is provided with a cutout portion to receive said tip of said knife blade.

7. An adapter according to claim 6, in which said cutout portion has the shape of a triangular pyramid.

8. An adapter according to claim 7, in which said point protector has rounded-off edges.

9. An adapter according to claim 3, in which said means of said bootie for fitting over said end of said knife includes a cup-shaped portion to which said elastic strap is connected.

10. An adapter according to claim 9, in which said cup-shaped portion and said elastic strap are made of a single piece of elastomeric material.

11. An adapter according to claim 3, in which said means of said bootie for fitting over said end of said knife includes a circular portion to which said elastic strap is connected.

12. An adapter according to claim 11, in which said circular portion and said elastic strap are made of a single piece of elastomeric material.

13. An adapter according to claim 12, in which said circular portion is provided with a slit portion to receive said elastic strap therethrough in such a way as to form an abutment for said end of said knife that is remote from said blade tip thereof.

14. An adapter according to claim 4, in which said elastic strap is provided with a longitudinal slit at least in the vicinity of that portion thereof that is disposed through said hole in said point protector.

15. An adapter according to claim 4, in which said elastic strap along that side of said knife blade remote from a cutting edge thereof.

* * * * *